UNITED STATES PATENT OFFICE.

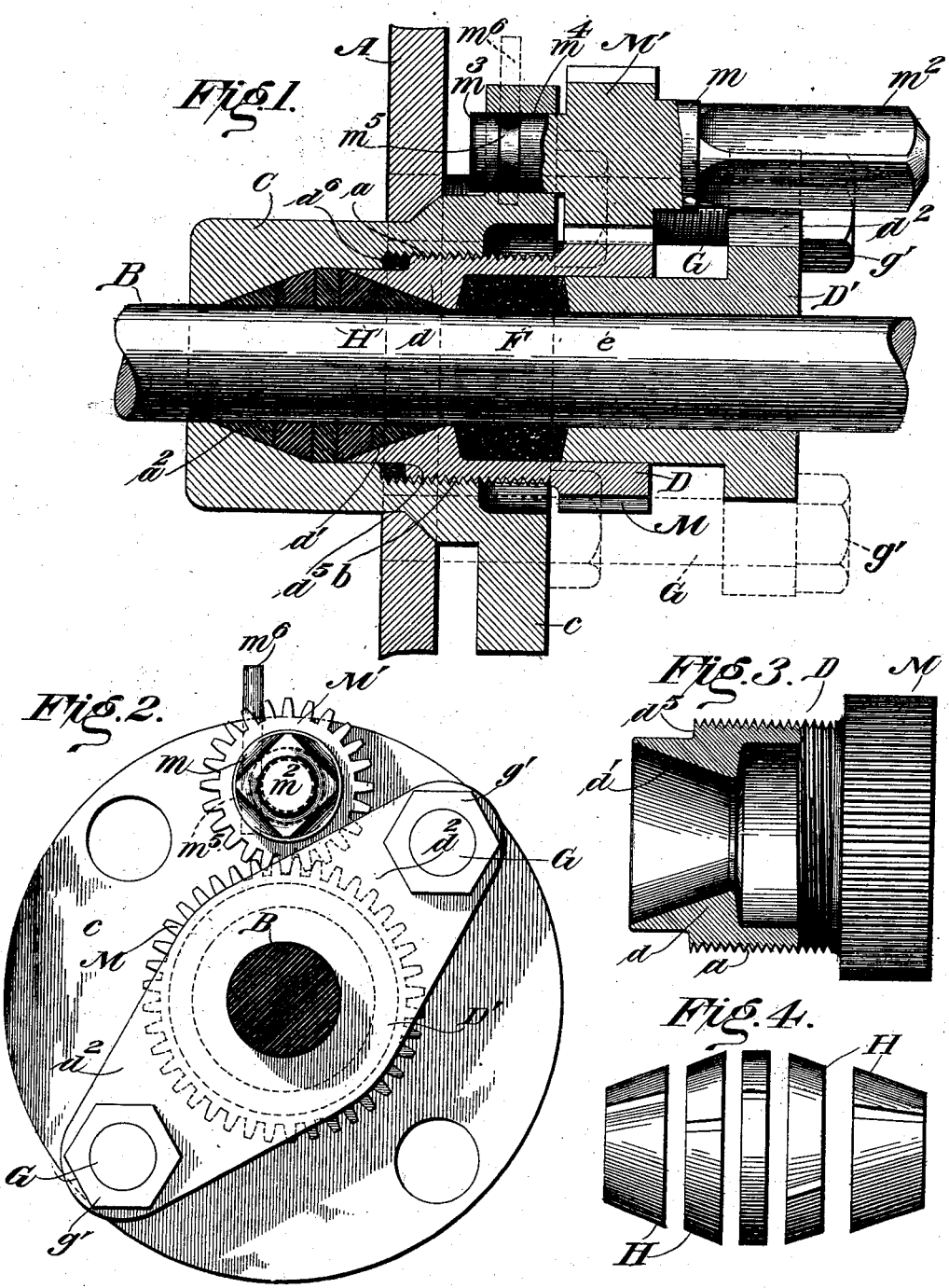

THOMAS GUNNI SAXTON, OF LEXINGTON, KENTUCKY, ASSIGNOR TO JASON R. BARR, OF LEXINGTON, KENTUCKY.

PACKING DEVICE FOR PISTON-RODS.

SPECIFICATION forming part of Letters Patent No. 691,813, dated January 28, 1902.

Application filed May 27, 1901. Serial No. 62,115. (No model.)

*To all whom it may concern:*

Be it known that I, THOMAS GUNNI SAXTON, a citizen of the United States, residing at Lexington, in the county of Fayette and State of Kentucky, have invented certain new and useful Improvements in Packing Devices for Piston-Rods; and I do hereby declare the following to be a full, clear, and exact description of the invention, such as will enable others skilled in the art to which it appertains to make and use the same.

This invention relates to packing devices for the piston-rods and valve-rods of steam and other engines; and it consists, substantially, in the improvements hereinafter definitely described, and pointed out in the claims The invention has reference more particularly to that class or type of packing devices in which a metallic or other packing is held upon the rod in a stuffing-box by means of a gland or follower; and the principal object of the invention is to provide simplified and effective devices or means for adjusting the gland or follower by which to compress the packing about the rod, and thereby seal the joint between the two.

Further objects will also more fully hereinafter appear when taken in connection with the accompanying drawings, in which—

Figure 1 represents a longitudinal sectional elevation of one form of packing device in connection with which my improvements are embodied, and Fig. 2 is an end view thereof looking to the left. Fig. 3 is a detail part-sectional view of one gland member, and Fig. 4 is a detail view of the packing-rings employed.

As a preferred embodiment of my present invention I have herein shown or illustrated the same in connection with substantially one of the forms of packing devices forming the subject-matter of my former application, filed July 2, 1900, Serial No. 22,348, although it is evident that the same may be applied to the well-known form of device wherein a single gland and a single packing only are employed.

It will clearly appear from the following description that my present invention is applicable to most any of the forms of rod-packing devices of this general character or type at present in use.

In carrying my invention into effect I may employ any suitable or preferred form of packing, (usually metallic rings,) which is tightly compressed upon or about the rod by means of the gland or follower working in the stuffing-box in the usual or well-known manner. In order to readily and securely effect the adjustment of the gland or member, I construct the same in part of a gear and I mount a pinion in proper position to engage said gear, said pinion being formed or provided with suitable means adapted to receive a wrench or other implement for turning the same in one direction or the other either to remove the gland or to compress the packing in the stuffing-box. To prevent the packing or gland from working loose after adjustments, I also provide suitable means for locking the pinion and gland in place relatively to the stuffing-box, said means being capable of ready insertion and removal when desired.

It will be understood, of course, that I am not limited in any manner whatever to the particular details of construction and arrangement of the several parts or elements herein shown.

Specific reference being had to the drawings, and more particularly to Figs. 1 and 2 thereof, (representing one of the embodiments of my former application referred to,) A represents a portion of a boiler-head or shell, B a throttle-rod or spindle, and C a stuffing-box of peculiar construction, through which said rod passes in the usual manner. Said parts may be of any desired construction and may be secured to the boiler in any proper manner. D and D' denote two members of a composite gland and packing-receptacle, each member having a cylindrical hollow body, one, as D, being threaded on its outer surface at $a$ and screwing into the interiorly-screw-threaded opening or bore $b$ of the said stuffing-box C, and the other member, as D', being smooth and slidably fitting within the member D, which latter also serves as a packing-receptacle. The said part or member D has at its inner end an inner annular enlargement or flange $d$, the outer face of which may be inclined or beveled at $d'$ to fit a correspondinglybeveled seat or surface of a packing ring or rings H, as will be explained. To similarly fit or conform to the outer surface of the innermost of said rings H, the bore of the stuffing-box is also preferably beveled or inclined at $a^2$. Instead of this particular construction of said gland member D and said stuffing-box C, however, I may in some instances construct the end of said member abrupt or perfectly straight and shape the interior of the stuffing-box accordingly, in which case other or additional rings may be employed to correspond to the shape of the interior of said stuffing-box thus formed. At $d^5$ I preferably provide an outer annular groove at the inner end of gland member D', in which groove is placed or seated a soft packing $d^6$. Fibrous or other packing F is also placed within the gland member D and which is compressed by the body portion $e$ of the gland member D'. The stuffing-box is formed or provided with an annular flange $c$, having suitable openings therein, through which threaded bolts G pass for securing the structure to the boiler-head, as shown. Said bolts also pass through suitable openings in exterior lugs or ears $d^2$ on the gland member D', as shown. Nuts $g'$ are provided on the outer ends of these bolts, by which the gland member D' is retained in the desired position upon said bolts and also by which the said member D' is moved or adjusted inwardly to compress the packing F within the gland member D. For the purpose of effecting also either an inward or outward adjustment of the gland member D, I form or provide the said member with an exterior-toothed flange constituting a gear-wheel or disk M, and engaging therewith is a pinion or spur-wheel M', which is rigid or integral with a shaft or spindle $m$, which in this instance is preferably of length at one side to extend beyond the flange or lugs $d^2$ of gland member D' and which is also preferably squared at $m^2$ for the purpose of receiving a wrench or other suitable implement, which may be applied thereto to effect movable engagement between the gear-wheel and pinion to adjust said member to compress the said packing or rings H. In order to hold this gland member to different positions of adjustment, I preferably form or provide an inner extension or prolongation $m^3$ of the shaft or spindle $m$ of the pinion or spur-wheel M', which extension is received in an opening $m^4$ in the flange $c$ of the stuffing-box, as shown. Said extension is formed with an annular groove $m^5$, and passing through the edge of said flange $c$ is a locking-pin $m^6$, which enters said groove and serves to lock the parts to any position of adjustment to which they may be brought through the turning of the spindle $m$. By the proper adjustment of both gland members it is evident that both the packings F and H are compressed, as well as the packing $d^6$. When the rings H are compressed together tightly, they grasp the rod and seal the joint around the same in the manner and for the purpose fully explained in my former application referred to. In regard to the locking of the pinion M' against turning it will be understood, of course, that other means than those herein specified could be employed with equal effect, and hence I am not limited to the particular means shown; but it may be stated that for the purposes of strength and security the present construction and arrangement have been found admirably suited or adapted in practice.

The annular groove $d^5$ of the gland D and the soft packing $d^6$ are not shown in my former application referred to, but are employed herein as a preferred arrangement.

The simplicity, security, and effectiveness of my present invention will be fully understood from the foregoing, and it is evident also in what manner the parts are applied or mounted in position for use. No material alteration is required to adapt the invention to many forms of stuffing-boxes and glands already in use, and the expense thereof is comparatively small and more than compensated for by the great advantage derived therefrom in use.

Having thus fully described my invention, what I claim as new, and desire to secure by Letters Patent of the United States, is—

1. A packing device for piston and valve rods, comprising a stuffing-box, a packing around the rod within the box, a gland or follower, a gear connection between said stuffing-box and gland, and means intermediate the gear connection and the stuffing-box for locking said connection against movement, substantially as described.

2. A packing device for piston and valve rods, comprising a stuffing-box, a packing around the rod within the box, a gland or follower having a rigid gear at the outer part thereof, a pinion engaging said gear and having an operating shaft or spindle, and means intermediate the pinion and the stuffing-box to prevent turning of said pinion, substantially as described.

3. A packing device for piston and valve rods, comprising a stuffing-box, a packing around the rod within the box, a gland or follower having a rigid gear at the outer part thereof, a pinion engaging said gear and having a shaft adapted at one end to receive a wrench, and means intermediate the other end of said shaft and the stuffing-box to prevent turning of said pinion, substantially as described.

4. In combination with the rod, the stuffing-box, the gland, and means for mounting and securing said parts together, a combined supplementary gland and packing-receptacle having a sleeve working in said stuffing-box, packing on the rod between the end of said sleeve and the inner end of the stuffing-box, and independent adjusting devices for said supplementary gland comprising a rigid gear-wheel, and an operating-pinion having a grooved shaft engaged by a locking device, substantially as described.

5. The combination of the stuffing-box provided with the flange having the hole or opening therein, the rod, a packing around the rod in the stuffing-box, a gland or follower having a rigid gear at the outer part thereof, a pinion engaging said gear and having a shaft adapted at one end to receive a wrench, and provided at or near its other end with an annular groove, said grooved end working or turning in the opening in the flange of the stuffing-box, and a locking-pin passing through said flange at the edge thereof and entering said groove.

In testimony whereof I affix my signature in presence of two witnesses.

THOMAS GUNNI SAXTON.

Witnesses:
J. B. BAYER,
J. S. TOMPKINS.